UNITED STATES PATENT OFFICE.

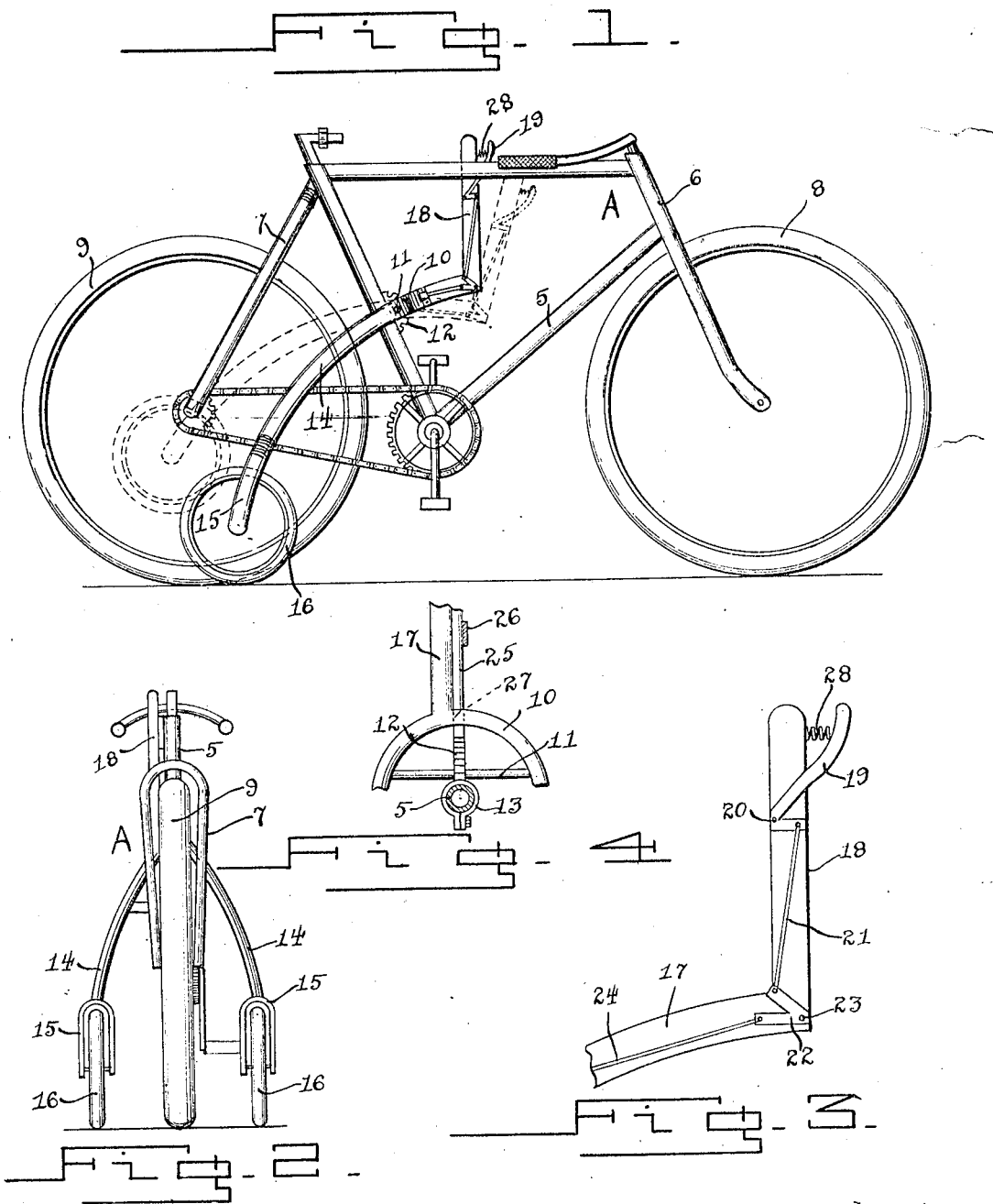

STANLEY A. RESSEGUIE, OF ABERDEEN, SOUTH DAKOTA.

BICYCLE-SUPPORT.

1,207,077. Specification of Letters Patent. Patented Dec. 5, 1916.

Application filed June 15, 1915. Serial No. 34,224.

*To all whom it may concern:*

Be it known that I, STANLEY A. RESSE-GUIE, a citizen of the United States, residing at Aberdeen, in the county of Brown and State of South Dakota have invented certain new and useful Improvements in Bicycle-Supports, of which the following is a specification.

This invention relates to bicycle attachments and particularly to that class which form a support for the machine when not in motion.

As a principal object, it is contemplated by this invention to provide a pair of small wheels pivoted by a suitable yoke and forks to a suitable portion of the bicycle frame and being adapted to be lowered into contact with the ground to support the vehicle when at a standstill.

The above and additional objects which will be hereinafter more specifically treated are accomplished by such means as are illustrated in the accompanying drawings, described in the following specification and then more particularly pointed out in the claim which is appended hereto and forms a part of this application.

With reference to the drawings, wherein there is illustrated the preferred embodiment of this invention as it is reduced to practice, and throughout the several views of which like characters of reference designate similar parts: Figure 1 is a side elevational view of a bicycle as equipped with the support means of the present invention, Fig. 2 is a rear elevation of the same subject-matter, Fig. 3 is a detail of the operating lever controlling movement of the support, and Fig. 4 is a detail showing the manner of pivoting the support.

The bicycle designated generally as A includes the usual intermediate frame 5 which is supported by the forward and rear forks 6 and 7 in which the steering and drive wheels 8 and 9 are respectively journaled. The support of this invention comprises a yoke member 10 having its bight braced by a rod 11 which serves to pivot the entire support upon a segment or toothed sector 12 which may be secured to one of the bars of the intermediate frame 5 by the employment of a split collar 13, all as illustrated in Fig. 4. Depending from the yoke 10 are a pair of bars 14 which extend rearwardly and preferably in the arcuate manner illustrated to support similar forks 15 in which are journaled a pair of wheels 16 in such manner as to be on opposite sides of the drive wheel 9 to form a secure support for the whole machine when not in motion. Since it is not desired, however, that the supporting wheels 16 be allowed to contact with the ground when the bicycle is ridden, means have been provided whereby the operator can readily control the position of the supporting wheels. Such means includes the stem 17 which is formed integrally with the yoke 10 and slightly offset from the axial center of the machine for a purpose which will later become obvious. At the extremity of this stem 17 there is provided the bell crank lever handle 18 which projects vertically upward above the intermediate frame 5 of the bicycle when the support is in use. Locking means for the purpose of coacting with the sector 12 in maintaining the support in the desired position are provided in the shape of the bell crank lever 19 which is pivoted as at 20 to the handle 18 and connected by a rod 21 to a second bell crank 22 pivoted at 23 to the juncture of the handle 18 and the stem 17. A connecting rod 24 leads to a locking pawl 25 which is slidably maintained upon the stem 17 through the medium of a bracket 26, such pawl being adapted to extend through a suitable aperture 27 formed in the yoke 10 in order to engage the teeth of the sector 12 which should be apparent from an inspection of Figs. 1 and 4. Resilient means 28 extend between the lever handle 18 and the locking handle 19 in order to maintain the pawl 25 in its adjusted position with respect to the sector 12, due to the rigid connections 21 and 24 between the operating lever and such pawl.

It will be seen from the foregoing, that there has been provided a reliable means for balancing the bicycle A which may either serve as a support when the vehicle is motionless or may act to preserve the equilibrium of a novice rider. While it has previously been proposed to add a single balance wheel after the manner of one of the applicant's wheels 16, this arrangement has been unsatisfactory, owing to the fact that the rider had to lean from one side to the other in order to maintain the balance, which is an undesirable and abnormal way to ride a bicycle. By provision of the applicant's paired balance wheels and by connecting such wheels with a single yoke 10, whereby both are simultaneously operable and by a single central lever, the previous disadvantages attendant upon bicycle supports of this character are now done away with. While in the foregoing, however, there has thus been illustrated in the drawings and described in the specification, such combination and arrangement of elements as constitute the preferred embodiment of this invention, it is desired to emphasize the fact that such minor changes in the matters of proportion and degree may be made in later adaptations of this device as shall not alter the spirit of the invention as defined in the appended claim.

What is claimed is:

The combination with a bicycle, of a toothed sector secured to the frame of the bicycle, a yoke pivoted to said sector, rods continuing said yoke, a fork carried by each rod, a balance wheel journaled in each fork, a stem for the yoke, an operating handle connected to the stem to control movement of the wheels into contact with or removal from the ground, and means normally engaged with said sector and operable to lock the yoke and wheels in a set position.

In testimony whereof I affix my signature in presence of two witnesses.

STANLEY A. RESSEGUIE.

Witnesses:
J. C. DALY,
C. A. LUM.